United States Patent Office 3,743,625
Patented July 3, 1973

3,743,625
1,4-BIS-[BENZOXAZOLYL-(2')]-NAPHTHALENE DERIVATIVES
Hans Frischkorn, Hofheim, Taunus, and Ulrich Pintschovius and Horst Behrenbruch, Kelkheim, Taunus, Germany, assignors to Farbwerke Hoechst Aktiengesellschaft vormals Meister Lucius & Bruning, Frankfurt am Main, Germany
No Drawing. Application Sept. 29, 1970, Ser. No. 76,622, which is a continuation-in-part of abandoned application Ser. No. 655,768, July 25, 1967. Divided and this appplication July 19, 1972, Ser. No. 273,322
Claims priority, application Germany, July 27, 1966, F 49,793; July 6, 1967, F 52,873
Int. Cl. C08g 17/08
U.S. Cl. 260—75 N                  2 Claims

ABSTRACT OF THE DISCLOSURE 1,4-bis[benzoxazolyl-(2')] - naphthalenes having carboxy or carboxylic acid ester groups on the benzoxazole groups, which compounds are excellent optical brighteners, especially for polyamides and polyesters.

---

This is a division of application Ser. No. 76,622 filed Sept. 29, 1970, which in turn is a continuation-in-part of application Ser. No. 655,768 filed July 25, 1967, now abandoned.

The present invention relates to new 1,4-bis-[benzoxazolyl-(2')]-naphthalenes substituted by carboxy or carboxylic ester groups in the benzo moieties, especially to compounds of the formula

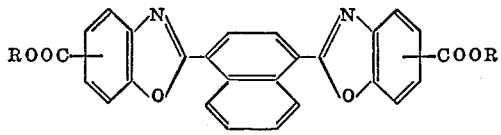

(I)

in which R is hydrogen, alkyl of 1 to 20 carbon atoms, cyclohexyl, or alkyl of 1 to 4 carbon atoms substituted by hydroxy, alkoxy of 1 to 4 carbon atoms, phenyl or dialkylamino, the alkyl moieties of which have 1 to 4 carbon atoms, or quaternary salts of said dialkylamino groups. Especially useful are compounds in which R is hydrogen, alkyl of 1 to 16 carbon atoms, cyclohexyl, β-hydroxyethyl, benzyl, β-phenylethyl, lower-alkoxy-lower alkyl, (di-lower-alkyl-amino)-lower-alkyl or (tri-lower-alkyl-ammonium)-lower-alkyl metho-sulfate. The terms "lower alkyl" and "lower-alkoxy" define groups having 1 to 4 carbon atoms. Preferred are compounds having the COOR groups in the 5 position of the benzo nuclei.

A further object of the present invention is the use of said new compounds as optical brighteners, especially for polyethylene glycol terephthalate substrates.

A specific method for brightening polyethyleneglycol terephthalate is the addition of said new compounds to the starting substances for the manufacture of polyethyleneglycol terephthalate, thus causing the incorporation of the brightener dicarboxylic acid moiety into the polyester material. Hereby a polyethyleneglycol terephthalate having partially instead of terephthalate units of the formula

recurring units of the formula

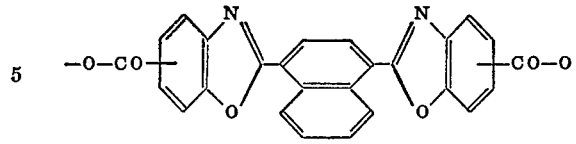

is obtained.

From U.S. Pat. No. 3,336,330 the use of yellow in solution reddish to greenish blue fluorescing benzoxazolvl compounds of the general formula

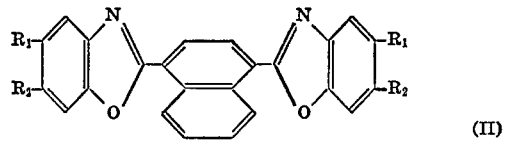

(II)

in which the radicals $R_1$ and $R_2$ represent hydrogen, an alkyl or aryl group, a halogen atom, or together a condensed hydroaromatic ring, as optical brighteners is known, especially in the manufacture of filaments and foils in which case the brighteners may be added to the starting substances for the fabrication of the high molecular weight product.

As demonstrated by extraction with methylene chloride, the known brighteners are readily removed from the substrate, since the brightener molecule is only dissolved in the polymer rather than chemically linked to it.

From U.S. Pat. No. 3,255,199 similar compounds having instead of the 1,4-naphthylene bridge a 2,5-thiophene bridge, from French Pat. No. 1,409,972 analogous compounds, having a p,ω-styryl bridge and from Canadian Pat. No. 567,665 compounds having a 1,4-phenylene bridge are known. All of said compounds proved to be inferior to the new brighteners as regards their capability of brightening polyethyleneglycol terephthalate.

It has now been found that yellowish to yellow 1,4-bis-[benzoxazolyl-(2')]-naphthalene derivatives of the general formula

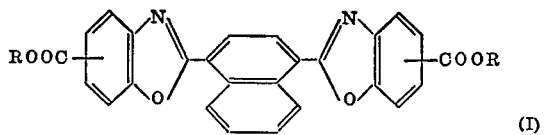

(I)

in which R has the meanings given above, can be obtained by condensing 1 mol of the naphthalene dicarboxylic acid-(1,4) after transformation into its diacid chloride together with 2 mols of the o-aminophenols of the general Formula III

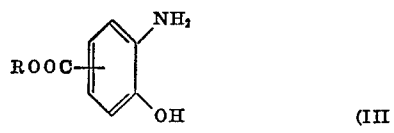

(III)

in which R is defined as above, and heating the obtained di-N,N'-acyl compounds of the general formula

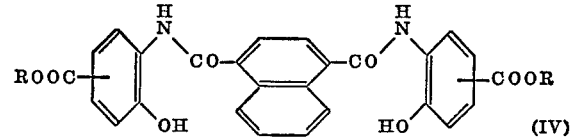

(IV)

in an inert gas atmosphere, preferably introgen, in solvents with elevated boiling points, preferably 1,2,4-trichlorobenzene or in mixtures of trichlorobenzenes, to interior temperatures of more than 200° C., preferably 215–220° C., if desired, in the presence of catalysts like zinc chloride or p-toluenesulfonic acid and, if desired, saponifying the ester groups into the free carboxylic acid groups.

As o-aminophenols of Formula III there may be used, for example, 2-amino-3-hydroxy-benzoic acid methyl ester, 3-amino-2-hydroxy-benzoic acid methyl ester, 3-amino-4-hydroxy-benzoic acid methyl ester or, respectively, 4-amino-3-hydroxy-benzoic acid methyl ester and the corresponding carboxylic acids. Instead of the methyl esters there may be used as well the following esters of the mentioned aminohydroxy-benzoic acids: the ethyl, propyl, iso-propyl, n-butyl, tertiary butyl, n-amyl, n-hexyl, n-heptyl, n-octyl, n-nonyl, n-decyl, n-undecyl, n-dodecyl, cetyl and lauryl esters.

Saponification of the 1,4-bis-[5'-carbalkoxy-benzoxazoyl-(2')]-naphthalene compounds to the corresponding dicarboxylic acids may be carried out by heating them in solvents with an elevated boiling point, such as ethylene glycol or a mixture of solvents with elevated boiling points, such as ethylene glycol and o-dichloro-benzene in the presence of an excess of sodium hydroxide solution to temperatures ranging from about 140° C. to 200° C. while distilling off water and alcohol. Another process for the preparation of the compounds of Formula I consists in reacting 1,4-zis-[carbomethoxy-benzoxazolyl-(2')]-naphthalenes (I, R=CH$_3$) with higher boiling alcohols in the presence of alcoholates of the corresponding alcohols and, if desired, alkylating agents, such as alkyl halides or dialkylsulfates, acting upon the reaction products as far as these contain groups capable of being quaternized.

As alcoholic compounds which may be used for transesterification there may be mentioned for instance: n-butanol, tert.-butanol, n-amylalcohol, 2-ethylbutanol-(1), octanol, cetylalcohol, laurylalcohol, cyclohexanol, 2-,3-,4-methylcyclohexanol, glycol, propanediol-(1,2), n-butanediols-(1,3) and -(1,4), 2-methyl-n-butanediol-(1,3), n-hexanediol-(2,5), glycerine, pentaerythrite, diethyleneglycol, triethyleneglycol, glycolmonomethyl ether or respectively -monoethyl ether and -mono-n-butyl ether, 3-methoxy-n-butanol-(2), glycide, benzylalcohol, 2-phenylethanol-(1), 4-isopropylbenzyl alcohol, 2-dimethylaminoethanol-(1), 2 - diethylaminoethanol(1), 2-di-n-butylamino-ethanol-(1), 1-dimethylaminopropanol-(2).

The naphthalene-dicarboxylic acid-(1,4) may be converted into the corresponding acid chloride in known manner such, for instance, as reacting it with thionylchloride, if desired, in the presence of an organic solvent like toluene or chlorobenzene.

The reaction of at least 2 mols of o-aminophenols of Formula III with 1 mol of the acid chloride is advantageously carried out in an organic solvent, such as chlorobenzene, and in order to bind the hydrochloric acid which dissociates, in the presence of a tertiary base, for example dimethylaniline, at an elevated temperature, preferably at about 50-110° C. The di-N,N'-acyl-compounds of Formula IV which have crystallized are filtered off with suction and are freed from adhering solvents by washing with a lower alcohol like methanol or by steamdistillation.

The transformation of di-N,N'-acyl compounds of Formula IV into the benzoxazols of Formula I is effected in an inert gas atmosphere, preferably nitrogen, in a high boiling solvent. As such are appropriate, above all, 1,2,4-trichlorobenzene or mixtures of trichlorobenzenes. The interior temperatures should be above 200° C., preferably at 215-220° C. As catalysts there may be used compounds like zinc chloride or p-toluenesulfonic acid.

The transesterification of 1,4 - bis[carbomethoxybenzoxazolyl-(2')]-naphthalenes (I, R=CH$_3$), is effected with a larger excess of a higher boiling alcohol in the presence of the alcoholate of the respective alcohol at an elevated temperature, preferably 120-160° C., whereby the methanol which is freed is distilled off. It is advantageous to add the catalyst in small portions, for example in three, and to use a quantitative proportion of 0.025 mol of alcoholate per 1 mol of ester. As far as the esters contain a dialkylaminoalkyl group this may be quaternized by a treatment with quaternizing agents such, for example, as alkyl halides, dialkyl sulfates or alkyl-p-toluene-sulfonates.

It has now been found that yellowish to yellow, in solution reddish to greenish blue fluorescing benzoxazol compounds of the above-mentioned general Formula I can be used as optical brighteners, especially in the manufacture of filaments and foils, in which case the brightening agent may be added to the substances which serve as starting materials for the fabrication of the high molecular weight product.

When these new bifunctional brighteners are added to the starting substances for the manufacture of polyester fibers or foil of the type of polyethyleneglycol terephthalate there are obtained extraordinarily persisting brightening effects. As carboxylic acids or respectively bisesters these new brighteners are incorporated into the polyester material during the polycondensation, that is, they are anchored in the substrate by a genuine ester linkage. Whereas brighteners without any carboxy or, respectively, carboxylic ester group, which in the fibrous or foil material are only present in dissolved form, are in most cases easily extracted completely with organic solvents like methylene chloride, the products according to the present invention which are anchored by a genuine chemical linkage in the polyester material, are virtually inseparable by extraction with methylene chloride or similar solvents.

This chemical link to the polyester material is combined with an outstanding resistance to sublimation. A further advantage of these new compounds lies in the fact that they do not pass over during the polycondensation which takes place in vacuo while glycol is being distilled off, because of their chemical inclusion into the polycondensate which forms, and thus an impurity of the regained glycol is avoided. Due to this fact, uncertainties as regards the quantity of brightening agent which remains in the fibrous material during polycondensation are excluded to a large extent.

Especially in the case of knit goods made of 100% polyester fibres or in the case of polyester and cotton textiles an insufficient resistance to sublimation of the brightener may lead to a reduction of the degree of whiteness during thermofixation, while finishing or during the condensation of synthetic resins.

With respect to the afore-mentioned properties in the field of technical application, the products according to the present invention are superior to the products known hitherto, which in the fibrous material are present only in dissolved form, because of their ester linkage to the fibrous or foil material and the thus obtained high resistance to sublimation.

In textile fibres and foils made of polyamide, for example, of the type of polycaprolactam, a chemical linkage of the new bifunctional brightening agent can easily be proved. For example, when the compounds of the general Formula I are added to ε-caprolactam before its polymerization or to the final polyamide before its shaping to filaments or foils, optically brightened materials are obtained which contain the brightener in non-extractable form. Whereas brighteners without a carboxy or respectively carboxylic ester group, which in the fibrous or foil material are present only in dissolved form, can in most cases be extracted to a large extent with organic solvents like methylene chloride, the products according to the present invention which supposedly are anchored in the polyamide by a carbonamide link, are virtually inseparable by extraction with methylene chloride or similar solvents. Another important advantage is connected with the fact that the new compounds are insoluble in the aqueous solutions used for regaining the mono- or oligomeric caprolactam. A concentration of the brightener in these washing solutions susceptible of leading to a non-controllable distribution of the brightener between monomeric and polymeric caprolactam is thus impossible. Therefore, on the one hand uniform brightening effects are obtained and, on the other hand, pure mono- and oligomers and recovered.

With the chemical anchorage of the brighteners in the polyamide fibre according to the present invention a very good resistance to sublimation is achieved as well. An insufficient resistance to sublimation of the optical brightener may lead to a decrease of the degree of whiteness when thermofixing the polyamide fibre.

The new compounds in which R represents a N,N-dialkylaminoalkyl group or, respectively, a corresponding quaternary trialkylammonium group are soluble in water or dilute acids and are especially appropriate as brightening agents for fibrous materials with resistance to light; above all those of polyacrylonitrile and polyacrylonitrile-copolymers. Especially high degrees of whiteness are achieved when the brightening of these fibrous materials is carried out in the presence of oxidative bleaching agents such as sodium chlorite.

Further synthetic materials, on which high degrees of whiteness are obtained, are: polymerization products of vinyl chloride, vinylidene chloride and their copolymers which still contain a small amount of materials susceptible of being copolymerized with vinyl chloride or respectively vinylidene chloride; polymerization products of the type of polyethylene or polypropylene; homo- or copolymers of trioxane and cyclic ethers such as ethylene oxide, propylene oxide, oxa-cyclobutane glycolformalene, diglycolformalene, especially those with ethylene oxide and polycondensation products.

If desired, textile and non-textile structures of the mentioned synthetic materials can be optically brightened with the new compounds of the general Formula I at an increased temperature, even after their shaping.

For this purpose these substances are used in known manner in form of aqueous dispersion, if desired with dispersing agents or in form of solutions. The new compounds may be used for the brightening of textile materials also together with oxidative and reductive chemical bleaching agents; furthermore, they may also be added to commercial detergents in order to embellish the washed goods.

The optimum application quantities, which may vary within wide limits (0.001 to 2.0%, preferably 0.01 to 0.5%, referred to the weight of the goods), depend on the substrate and the brightening method; they are easily ascertained by simple preliminary tests.

As compared to the optical brighteners known from the British Patent 824,659 the products according to the present invention are distinguished by substantially higher brightening capacity, in particular in the case of textile materials of polyesters or polyamides. To the brightening agents described in Belgian Patent 663,227 they are superior as regards their extraordinarily high resistance to sublimation and solvents.

EXAMPLE 1

21.6 parts by weight of naphthalene-dicarboxylic acid-(1,4) are heated in 400 parts by volume of toluene together with 35.7 parts by weight of thionyl chloride for about 2–3 hours, to 100–110° C. At 105–110° C., 40 parts by volume of toluene are distilled off in a nitrogen stream, and the parts by volume which have passed over, are substituted by fresh toluene. The solution of acid chlorine thus obtained is added to a mixture of 33.4 parts by weight of 3-amino-4-hydroxy-benzoic acid methyl ester and 36 parts by weight of dimethylaniline within a quarter of an hour at 70–75° C., it is stirred for another two hours at the same temperature and then the batch is allowed to cool while stirring. The diamide which has precipitated is separated, washed with toluene and methanol and dried. 45.0 parts by weight of diamide of the melting point 284–287° C. are obtained.

45 parts by weight of the diamide obtained are heated in 200 parts by volume of 1,2,4-trichlorobenzene with the addition of 1 part by weight of anhydrous zinc chloride in a weak nitrogen stream for three hours to approximately 210° C. (interior temperature). Some 30 parts by volume of trichlorobenzene and water distill over. It is cooled down to room temperature, and the 1,4-bis-[5'-carbomethoxy-benzoxazolyl-(2')]-naphthalene (compound V, Table 1) which has precipitated is filtered off with suction. The product is washed and dried. 38.5 parts by weight of compound V of the melting point 281–284° C. are obtained. A product, recrystallized several times from chlorobenzene, melts at 288–289° C. (yellow crystals).

If instead of 1 part by weight of anhydrous zinc chloride 1 part by weight of p-toluene-sulfonic acid is used for the ring formation, compound V is equally obtained. The mixed melting point with a sample, which was obtained with anhydrous zinc chloride shows no depression.

In analogous manner compounds VI and VII are obtained, when using 3-amino-4-hydroxy-benzoic acid ethyl ester or respectively 4-amino-3-hydroxy-benzoic acid methyl ester instead of 3-amino-4-hydroxy-benzoic acid methyl ester as indicated.

EXAMPLE 2

20.5 parts by weight of 1,4-bis-[5'-carbomethoxy-benzoxazolyl-(2')]-naphthalene are suspended in 450 parts by volume of n-octanol and transesterified by heating them to, at first, 170° C. interior temperature, in the presence of 1.8 parts by volume of a solution of 23 parts by weight of sodium in 1,000 parts by volume of n-octanol, and slowly distilling off the methanol during which reaction the temperature falls down to 140° C., as a consequence of the fact that during transesterification 350 parts by volume of n-octanol are distilled off at a pressure of 700–200 torr. Two hours after the starting substance has dissolved completely, 0.5 part by volume of glacial acetic acid are added in order to render the catalyst ineffective. The residue is treated with 200 parts by volume of methanol, filtered off with suction at room temperature and washed with methanol. 26 parts by weight of 1,4-bis[5'-carbo-octoxy benzoxazolyl-(2')]-naphthalene (compound VIII, Table 1) are obtained as crude product. After recrystallization from ethyl acetate the melting point is 122.5–124° C. (yellowish leaflets).

EXAMPLE 3

18.5 parts by weight of 1,4-bis-[6'-carbomethoxy-benzoxazolyl-(2')]-naphthalene are suspended in a mixture of 300 parts by volume of dimethylformamide and 200 parts by volume of 2-ethyl butanol-(1) and transesterified at an interior temperature of 158° C., in the presence of 2.0 parts by volume of a solution of 2.3 parts by weight of sodium in 100 parts by volume of 2-ethyl-butanol-(1) in the course of nine hours. After neutralizing the catalyst with 0.4 part by weight of glacial acetic acid the batch is evaporated to dryness in vacuo. The residue is then treated with steam, filtered off with suction after addition of 47 parts by weight of potassium chloride at approximately 75° C., and ultimately washed with water. 23.6 parts by weight of 1,4-bis-[6'-carbo-2''-ethylbutoxy - benzoxazolyl - (2')]-naphthalene (compound IX, Table 1) are obtained as a crude product. After recrystallization from ethyl acetate the product melts at 186–188° C. (yellow crystals).

EXAMPLE 4

20.2 parts by weight of 1,4-bis-[5'-carbethoxy-benzoxazolyl-(2')]-naphthalene are heated to an interior temperature of 160–165° C., in a mixture of 100 parts by volume of o-dichlorobenzene and 200 parts by volume of ethylene glycol, and in the presence of 5 parts by volume of a solution of 2.3 parts by weight of sodium in 100 parts by volume of anhydrous glycol, which is added in 5 portions at intervals of half an hour each, transesterified in a weak vacuum (between 200 and 700 torr.). After addition of 0.7 part by volume of glacial acetic acid, finally the batch is evaporated at the complete aspirator vacuum. The residue is brought to ebullition with 200 parts by volume of ethanol of 95% strength. The nondissolved parts are filtered off with suction after cooling to 5° C. 20.6 parts by weight of 1,4-bis-[5'-carbo-β - hydroxyethoxy - benzoxazolyl-(2')]-naphthalene (compound XII, Table 1) of the melting point 267.5–271° C. are obtained. By recrystallization from pyridine with the addition of charcoal the melting point of rises to 278–279° C. (greenish yellow crystals).

EXAMPLE 5

15.2 parts by weight of 1,4-bis-[5'-carbo-β-dibutylaminoethoxy-benzoxazolyl-(2')]-naphthalene (compound XIV, Table 1) are dissolved while heating in 150 parts by volume of toluene. After cooling off to 30–35° C., 7.5 parts by weight of dimethylsulfate are added. Thereby a precipitate forms which does not dissolve any more, even when heated to the boil. It is filtered off with suction, while cool, and after-washed with toluene. 18 parts by weight of the quaternary salt XV (Table 1) are obtained in form of a green-yellow powder of the decomposition point 175–184° C. The product is water-soluble.

EXAMPLE 6

36 parts by weight of 1,4-bis[5'-carbomethoxy-benzoxazolyl-(2')]-naphthalene are heated in a mixture of 300 parts by weight of n-hexadecanol-(1) (cetylalcohol) and 260 parts by weight of o-dichlorobenzene to 170–176° C. and, in the course of three hours, there are added, portionwise, 21 parts by volume of a warm dissolution of 23 parts by weight of sodium in 1000 parts by volume of cetylalcohol. The starting substance is completely dissolved during the transesterification. Subsequently, the catalyst is neutralized by the addition of 2.2 parts by weight of glacial acetic acid and then the o-dichlorobenzene and the cetylalcohol are distilled off in vacuo. The residue is washed with 200 parts by volume of methanol. After drying 64.3 parts by weight of 1,4-bis-[5'-carbohexadecoxy-benzoxazolyl-(2')]-naphthalene (Compound XVIII, Table 1) of the melting point 102.5–105.5° C. are obtained. A product recrystallized several times from dioxane with the addition of charcoal melts at 112–113° C.

In analogous maner Compound XVII is obtained when using n-dodecanol-(1) (laurylalcohol) instead of n-hexadecanol-(1).

EXAMPLE 7

50.6 parts by weight of 1,4-bis-[5'-carbethoxy-benzoxazolyl-(2')]-naphthalene are heated to the boil together with 1300 parts by weight of o-dichlorobenzene and 2,780 parts by weight of glycol. While stirring, 28 parts by weight of concentrated sodium hydroxide solution (12.9 moles/l.) are added dropwise and boiled during three hours under reflux. The o-dichloro-benzene and the larger part of glycol are then distilled off at a pressure of 25 torr. The residue is added with 20 parts by weight of glacial acetic and 1180 parts of ethanol, heated during 10 minutes to the boil; after cooling off to room temperature the acid which has precipitated is filtered off with suction and the batch is washed neutral with water. The suction product which is still moist is recrystallized from 2,000 parts by weight of pyridine with the addition of 10 parts by weight of charcoal.

41.0 parts by weight of 1,4-bis-[5'-carboxy-benzoxazolyl-(2')]-naphthalene (Compound XIX, Table 1) are obtained in form of a yellow powder which melts at about 370° C. under decomposition.

The compounds listed in the following table which are not mentioned in Examples 1 to 7 can be prepared in an analogous manner.

TABLE 1

R—[naphthalene]—R

| Formula No. | Constitution, R equal— | Melting point in ° C. |
| --- | --- | --- |
| V | $H_3COOC$—[benzoxazolyl] | 288–28 |
| VI | $H_5C_2OOC$—[benzoxazolyl] | 265–266 |
| VII | $H_3COOC$—[benzoxazolyl] | 310–312 |
| VIII | $H_{17}C_8OOC$—[benzoxazolyl] | 122.5–124 |
| IX | $H_2C$—OOC—[benzoxazolyl], $C_2H_5$—CH, $CH_2$, $CH_3$ | 186–188 |

TABLE I—Continued

| Formula No. | Constitution, R equal— | Melting point in °C. |
|---|---|---|
| X | ⟨phenyl⟩—CH₂OOC—⟨benzoxazole⟩ | 259–261 |
| XI | ⟨phenyl⟩—CH₂CH₂OOC—⟨benzoxazole⟩ | 232–233 |
| XII | HOCH₂CH₂OOC—⟨benzoxazole⟩ | 278–279 |
| XIII | C₄H₉OCH₂CH₂OOC—⟨benzoxazole⟩ | 128–12 |
| XIV | (C₄H₉)₂NCH₂CH₂OOC—⟨benzoxazole⟩—C— | 137–139 |
| XV | (C₄H₉)₂(CH₃)N⁺—CH₂CH₂OOC—⟨benzoxazole⟩—C—, ⁻OSO₃CH₃ | ¹175–184 |
| XVI | ⟨H-phenyl⟩—OOC—⟨benzoxazole⟩—C— | 262–262.5 |
| XVII | C₁₂H₂₅—OOC—⟨benzoxazole⟩—C— | 114–115.5 |
| XVIII | —C₁₂H₃₃OOC—⟨benzoxazole⟩—C— | 112–113 |
| XIX | HOOC—⟨benzoxazole⟩—C— | ca.¹ 370 |

¹ Decomposition.

EXAMPLE 8

1 kg. of chips of polyethyleneglycoleterephthalate ($\epsilon_{spec}$=0.08) delustered with titanium dixoide are sprayed with a solution of 0.5 g. of compound V (Table 1) in 100 ml. of ethyl acetate, dried and thoroughly mixed. The thus prepared chips are spun in an extruder which is provided with a spinning head at a spinning temperature of 285° C., to filaments:

Nozzle _____ mm__ 24/0.25
Outlet _____ m./min__ 1,000
Denier _____ 50/24

At 150° C., the obtained filaments are straightened to 3.5 times their length. They show the same technological properties, yet a remarkably higher degree of whiteness than the filaments fabricated without any brightening agent.

EXAMPLE 9

1 kg. of caprolactam, 30 g. of water, 4 g. of TiO₂ and 0.8 g. of compound VI (Table 1) are heated during four hours in the autoclave digester under pressure, to 240° C., then, during 60 minutes, under distension.

Through a slit-like nozzle, the thus obtained polyamide melt is chilled in band form in water, chipped and dried. In comparison with a correspondingly fabricated blank product the crude substance possesses a strongly elevated grade of whiteness.

EXAMPLE 10

A textile fabric of polyethyleneglycolterephthalate filaments which has been pre-bleached in the usual manner with sodium chlorite is impregnated with an aqueous dispersion of 5 g./l. of compound V and squeezed on a foulard in such a way that the textile contains 60% of its weight of dispersion. Then the textile is treated at a temperature of 190° C. for 60 seconds with hot air. After this treatment it shows a fine uniform shade of white.

EXAMPLE 11

From suspension vinylchloride a hard foil is obtained with the addition of 3% by weight of titanium dioxide and 0.05% by weight of compound VI (Table 1) by rolling it at 80° C. during 15 minutes. The foil possesses a notably higher degree of whiteness than a foil manufactured in the same way, yet without the addition of the brightening agent.

A similarly good effect is also shown with compound VI in foils which have been prepared with the use of emulsion polyvinylchloride.

EXAMPLE 12

12 parts by weight of dimethylterephthalate and 8 parts by weight of ethyleneglycol are melted under a nitrogen atmosphere in a receptacle of stainless steel with a stirring device at 140–150° C. The molten mass is slowly heated to 145° C. and added with 0.02 part of zinc acetate dissolved in one part of glycol. The reatcion is carried out over a period of three hours at a temperature of 160° to 220° C. and at atmospheric pressure. During the course of the reaction methanol and a part of the glycol are distilled off.

The obtained bis-($\beta$-hydroxyethyl)-terephthalate is pressed into a polycondensation receptacle of stainless steel. After addition of one part by weight of ethylene glycol with 0.03% of antimony trioxide
0.4% of titanium dioxide
0.031% of triphenylphosphite and
0.05% of compound XIX (Table 1)

the temperature of the molten mass is raised to 240° C. When the indicated temperature is reached, the pressure within the reaction receptacle is gradually reduced to a final vacuum of 0.4 torr with the aid of a vacuum pump, during which process simultaneously the temperature is raised from 240 to 278° C. After four hours the polycondensation is finished. The vacuum is filled with nitrogen which is under pressure. Then the melt is pressed out by the pressure of the nitrogen and, after chilling in water, it is granulated and dried.

The product obtained has an intrinsic viscosity of approximately 800. The softening point is at approximately 260° C. As compared to a product prepared without using compound XIX the material shows a strongly elevated grade of whiteness.

EXAMPLE 13

12 parts by weight of dimethylterephthalate, 8 parts by weight of ethylene glycol and 0.03% of compound XIX (Table 1) are molten in a stainless steel receptacle with a stirring device at 140–150° C., under a nitrogen atmosphere. The molten mass is slowly heated to 145° C., and added with 0.02 part by weight of manganese acetate dissolved in one part by weight of glycol. Within the temperature range of 160 to 220° C., at atmospheric pressure, methanol and finally glycol being distilled off, the transesterification is carried out within three hours.

The obtained bis-($\beta$-hydroxyethyl)-terephthalate is pressed into a polycondensation receptacle made of stainless steel. After addition of one part by weight of ethylene glycol with 0.03% of antimony trioxide
0.2% of titanium dioxide and
0.031% of triphenylphosphite the temperature of the molten mass is raised to 240° C. When the indicated temperature is achieved the pressure in the reaction receptacle is gradually reduced to a final vacuum of 0.4 torr with the aid of a vacuum pump, the temperature being elevated at the same time from 240° C. to 278° C. After four hours the polycondensation is finished. The vacuum is filled with nitrogen which is under pressure. Then the molten mass is pressed out by the pressure of the nitrogen and, after chilling in water, it is granulated and dried.

The product obtained has an intrinsic viscosity of approximately 800. The softening point is at 260° C. The material possesses in comparison with a product prepared without using compound XIX a strongly elevated degree of whiteness.

We claim:

1. A polyethyleneglycol terephthalate having partially instead of trephthalate units of the formula

recurring units of the formula

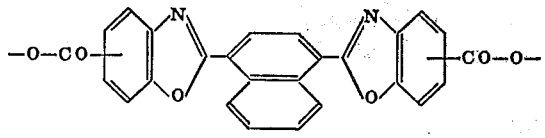

2. A polyethyleneglycol terephthalate as claimed in claim 1 having the 1,4-naphthalene-bis-benzoxazole-units in a ratio of 0.001 to 2% by weight, referred to polyethyleneglycol terephthalate units.

No references cited.

MELVIN GOLDSTEIN, Primary Examiner

U.S. Cl. X.R.

260—67 FP, 78 L, 88.7 B, 91.7, 92.8 A, 94.9 GB, 307 D